United States Patent
Wu

(10) Patent No.: US 8,279,818 B2
(45) Date of Patent: Oct. 2, 2012

(54) METHODS OF PACKET ELEMENT TRANSMISSION IN WIRELESS COMMUNICATIONS SYSTEM

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 169 days.

(21) Appl. No.: 12/549,345

(22) Filed: Aug. 27, 2009

(65) Prior Publication Data

US 2010/0110895 A1 May 6, 2010

Related U.S. Application Data

(60) Provisional application No. 61/109,930, filed on Oct. 31, 2008.

(51) Int. Cl.
*H04W 4/00* (2009.01)
(52) U.S. Cl. ...................................................... 370/329
(58) Field of Classification Search .................. 370/328, 370/329, 331, 332; 455/436
See application file for complete search history.

(56) References Cited

U.S. PATENT DOCUMENTS

| | | | |
|---|---|---|---|
| 2009/0163211 A1* | 6/2009 | Kitazoe et al. | 455/436 |
| 2009/0318180 A1* | 12/2009 | Yi et al. | 455/522 |
| 2010/0074222 A1* | 3/2010 | Wu | 370/331 |
| 2010/0077100 A1* | 3/2010 | Hsu et al. | 709/234 |

FOREIGN PATENT DOCUMENTS

| | | |
|---|---|---|
| WO | 2008060077 A1 | 5/2008 |
| WO | 2009104928 A1 | 8/2009 |
| WO | 2009154403 A2 | 12/2009 |

OTHER PUBLICATIONS

3GPP TS 36.321 V8.3.0 Evolved Universal Terrestrial Radio Access (E-UTRA) Medium Access Control (MAC) protocol specification, Sep. 2008.
3GPP TS 36.213 V8.4.0 Evolved Universal Terrestrial Radio Access (E-UTRA); Physical layer procedures, Sep. 2008.
Samsung: "Reliability of BSR", 3GPP TSG-RAN2 Meeting #62bis, Tdoc R2-083498, Jun. 30-Jul. 4, 2008, pp. 1-5, XP050140877, Warsaw, Polland.
Nokia Corporation, Nokia Siemens Networks: "Criteria for Short and Long BSR", 3GPP TSG-RAN WG2 Meeting #60bis, R2-080015, Jan. 14-18, 2008, XP050137919, Sevilla, Spain.
Office action mailed on Jan. 6, 2012 for the China application No. 200910208949.X, filing date Oct. 30, 2009, p. 1-4.

* cited by examiner

*Primary Examiner* — Kerri Rose
(74) *Attorney, Agent, or Firm* — Winston Hsu; Scott Margo

(57) ABSTRACT

A method of packet element transmission for a mobile device of a wireless communication system includes generating a control element including a triggered capability report and a header of the capability report when the mobile device has sufficient resources to transmit both of the capability report and the header thereof in a transmission opportunity.

13 Claims, 5 Drawing Sheets

METHODS OF PACKET ELEMENT TRANSMISSION IN WIRELESS COMMUNICATIONS SYSTEM

CROSS REFERENCE TO RELATED APPLICATIONS

This application claims the benefit of U.S. Provisional Application No. 61/109,930, filed on Oct. 31, 2008 and entitled "METHODS FOR HANDLING MAC CONTROL ELEMENT TRANSMISSION IN WIRELESS COMMUNICATIONS SYSTEM" the contents of which are incorporated herein.

BACKGROUND OF THE INVENTION

1. Field of the Invention

The present invention relates to a method utilized in a wireless communication and communication device thereof, and more particularly, to a method for improving transmission of packet elements in a wireless communication system and communication device thereof.

2. Description of the Prior Art

As today's applications for electronic systems grow at ever-increasing rates, the demand for better communications performance is never ceasing. Standards for various technologies such as the 3rd Generation Partnership Project (3GPP) High-Speed Packet Access (HSPA) and Long Term Evolution (LTE) work towards creating more efficient communication systems.

Architecture of the radio interface protocol of a LTE system includes three layers: the Physical Layer (Layer 1), the Data Link Layer (Layer 2), and the Network Layer (Layer 3), where a control plane of Layer 3 is a Radio Resource Control (RRC) layer, and Layer 2 is further divided into a Packet Data Convergence Protocol (PDCP) layer, a Radio Link Control (RLC) layer and a Medium Access Control (MAC) layer.

The main services and functions of the MAC layer include mapping between logical channels and transport channels; multiplexing/demultiplexing of RLC PDUs (protocol data units) belonging to one or different radio bearers into/from transport blocks (TB) delivered to/from the physical layer on transport channels; buffer status reporting; power headroom reporting; error correction through HARQ; priority handling between logical channels of one UE; priority handling between UEs by means of dynamic scheduling; and padding.

A MAC PDU consists of a MAC header, zero or more MAC Service Data Units (SDUs), zero, or more MAC control elements, and optional padding. Both the MAC header and the MAC SDUs are of variable sizes. A MAC PDU header consists of one or more MAC PDU sub-headers; each sub-header corresponding to either a MAC SDU, a MAC control element or padding. MAC PDU sub-headers have the same order as the corresponding MAC SDUs, MAC control elements and padding.

MAC control elements transmitted by a UE include a buffer status report (BSR) MAC control element, a power headroom report (PHR) MAC control element and C-RNTI (cell radio network temporary identifier) MAC control element. The Buffer Status reporting procedure is used to provide the serving eNB with information about the amount of data in the UL buffers of a UE for scheduling of uplink transmission. A Buffer Status Report MAC control element consists of either a short BSR and truncated BSR format or long BSR format.

If a BSR has been triggered since the last transmission of a BSR or this is the first time that a BSR is triggered and the UE has UL resources allocated for new transmission for this TTI, the UE generates a BSR MAC control element. However, the allocated UL resources may have insufficient capacity to transmit the generated BSR MAC control element. In this situation, the BSR is delayed.

Issue 1 is described as follows. When a BSR has been triggered since the last transmission of a BSR or this is the first time that a BSR is triggered and the UE has UL resources (e.g. transport blocks) allocated for new transmission for this TTI, the UE instructs a Multiplexing and Assembly procedure to generate a BSR MAC control element and starts/restarts the PERIODIC BSR TIMER. However, some transport block sizes (e.g. 16 and 24 bits) cannot include a long BSR (32 bits) if a long BSR is triggered. Besides, at serving cell change, the first UL-DCCH (Uplink Dedicated Control Channel) MAC SDU to be transmitted in the new cell has higher priority than MAC control elements for BSR. It is possible that the remaining space of the transport block which has included a C-RNTI and the first UL-DCCH MAC SDU is insufficient for a long BSR (32 bits) or a short BSR (16 bits). In this situation, the BSR MAC control element is still generated but unable to be transmitted in the TTI due to insufficient space of the transport block. One drawback is that the system failure occurs in an implementation. Another drawback is that the BSR is delayed to be sent to the eNode B. This impacts the scheduling efficiency of the eNode.

The Power Headroom reporting procedure is used to provide the serving eNB with information about the difference between the UE TX (Transmission) power and the maximum UE TX power. If a PHR has been triggered since the last transmission of a PHR and the UE has UL resources allocated for new transmission for this TTI, the UE obtains the value of the power headroom from the physical layer, and generates a PHR MAC control element based on the value reported by the physical layer. However, the allocated UL resources may have insufficient capacity to transmit the generated PHR MAC control element. In this situation, the PHR is delayed.

Issue 2 is described as follows. When a PHR has been triggered since the last transmission of a PHR and the UE has UL resources allocated for new transmission for this TTI, the UE obtains the value of the power headroom from the physical layer, instructs the Multiplexing and Assembly procedure to generate a PHR MAC control element based on the value reported by the physical layer. If the PHR is a "Periodic PHR", the UE restarts the PERIODIC PHR TIMER, and the UE restarts the PROHIBIT_PHR_TIMER. However, Issue 2 has similar problems to issue 1. Some transport block sizes (e.g. 32, or 40 bits) including a long BSR (32 bits) cannot include a PHR (16 bits), or some transport block sizes (16 or 24 bits) including a short BSR cannot include a PHR (16 bits). Besides, at serving cell change, the first UL-DCCH MAC SDU to be transmitted in the new cell has higher priority than MAC control elements for BSR. It is possible that remaining space of the transport block including a C-RNTI, the first UL-DCCH MAC SDU, and a BSR cannot include a PHR (16 bits). In this situation, the PHR MAC control element is still generated but unable to be transmitted in the TTI due to insufficient space of the transport block. One drawback is that the system failure occurs in an implementation. Another drawback is that a PHR is delayed to be sent to an eNode B. This impacts the scheduling efficiency of the eNode.

Issue 3 is described as follows. The range of the transport block size containing one MAC PDU is from 16 to 149776 bits with 24 bit CRC (cyclic redundancy check) error detection. A residual (undetected) error rate of the received MAC PDU is higher for a larger transport block size. A High residual error rate degrades the system performance.

SUMMARY OF THE INVENTION

Therefore, the present invention provides a method for improving transmission of packet elements in a wireless communication system and related communication device to solve the abovementioned problems.

According to an embodiment of the present invention, a method of packet element transmission for a mobile device of a wireless communication system is disclosed. The method includes generating a control element comprising a triggered capability report and a header of the capability report when the mobile device has sufficient resources to transmit both of the capability report and the header of the capability report in a first transmission opportunity.

According to an embodiment of the present invention, a communication device of a wireless communication system for packet element transmission is further disclosed and includes a computer readable recording medium, a processor, a communication interfacing unit, and a control unit. The computer readable recording medium is used for storing program code corresponding to a process. The processor is coupled to the computer readable recording medium and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes generating a control element comprising a triggered capability report and a header of the capability report when the communication device has sufficient resources to transmit both of the capability report and the header of the capability report in a first transmission opportunity.

According to an embodiment of the present invention, a method of packet element transmission for a mobile device of a wireless communication system is further disclosed. The method includes detecting errors of a received PDU, comprising a plurality of control elements and a plurality of SDUs, according to order of the plurality of control elements and the plurality of SDUs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
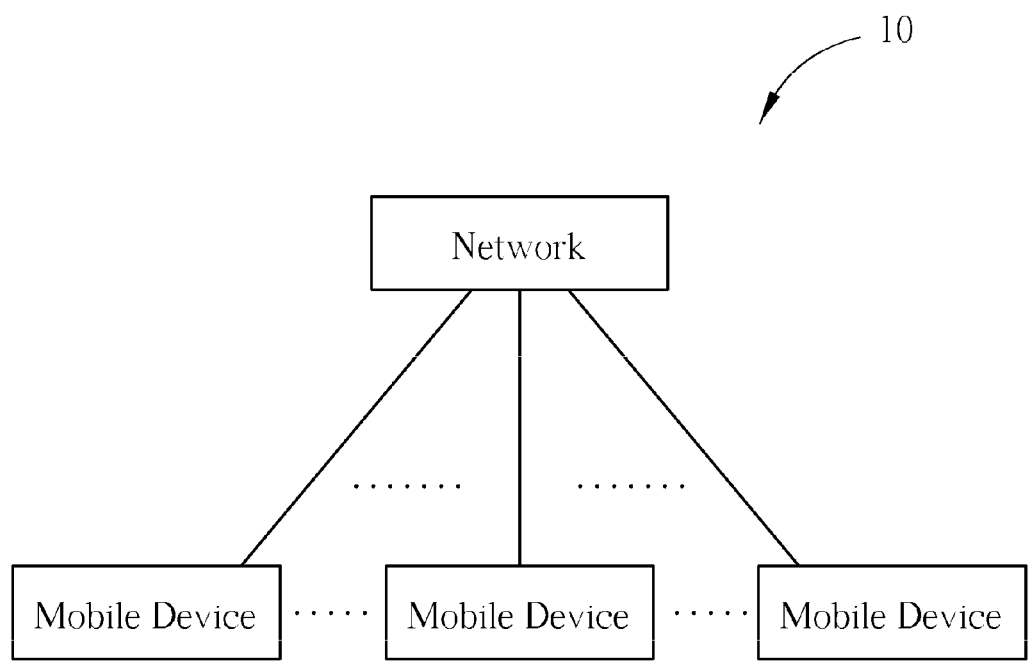
FIG. 1 is a schematic diagram of a wireless communication system.

Please refer to FIG. 1, which illustrates a schematic diagram of a wireless communication system 10 according to an embodiment of the present invention. Briefly, the wireless communication system 10 is composed of a network and a plurality of mobile devices. In FIG. 1, the network and the mobile devices are simply utilized for illustrating the structure of the wireless communication system 10. The wireless communication system 10 can be a UMTS (Universal Mobile Telecommunications System) or an LTE (long-term evolution) system. In the LTE system, the network is referred as a EUTRAN (evolved-UTRAN) comprising a plurality of eNBs, whereas the mobile devices are referred as user equipments (UEs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
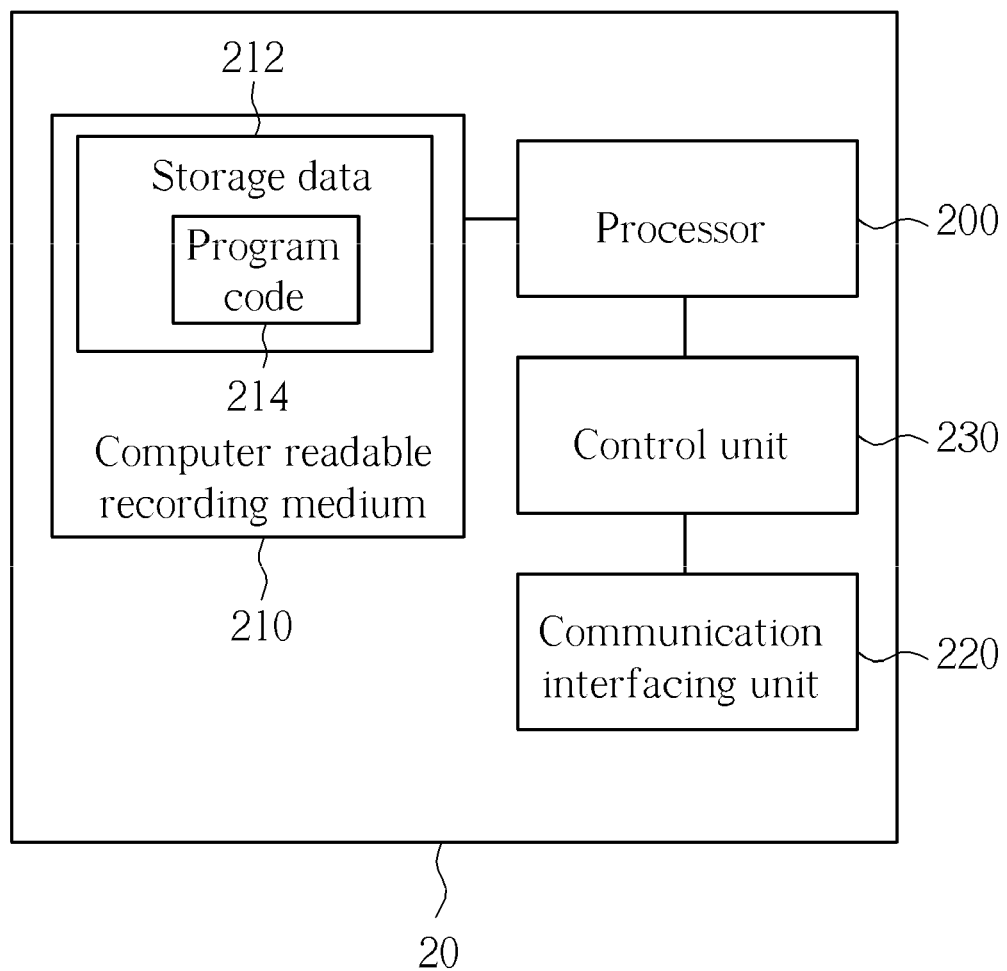
FIG. 2 is a schematic diagram of a communication device according to an embodiment of the present invention.

Please refer to FIG. 2, which illustrates a schematic diagram of a communication device 20 according to an embodiment of the present invention. The communication device 20 can be the mobile devices shown in FIG. 1 and includes a processor 200, a computer readable recording medium 210, a communication interfacing unit 220 and a control unit 230. The computer readable recording medium 210 is any data storage device that includes program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver and accordingly exchanges wireless signals with the network.

Figure 3:
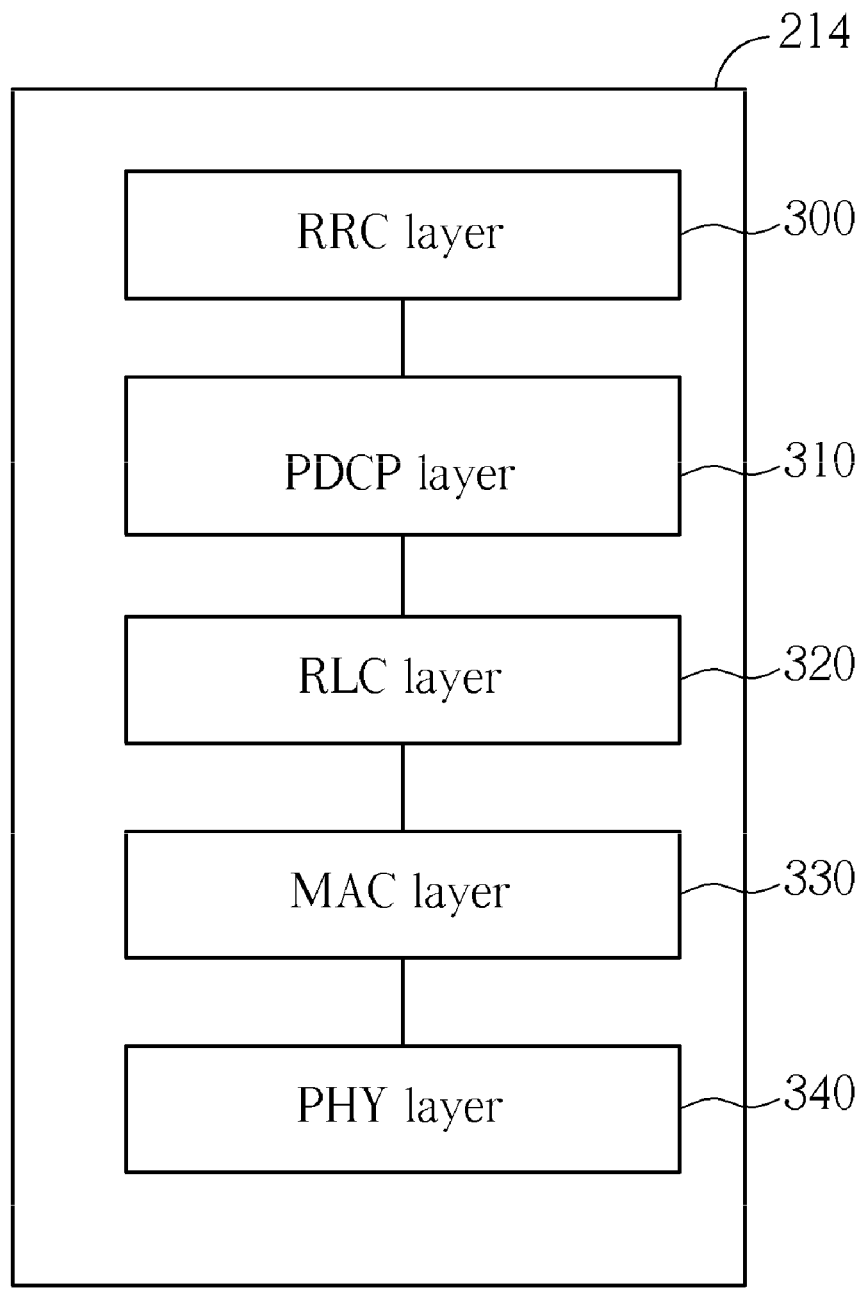
FIG. 3 is a schematic diagram of the program code for the LTE system according to an embodiment of the present invention.

Please refer to FIG. 3, which illustrates a schematic diagram of the program code 214 for the LTE system according to an embodiment of the present invention. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. For packets of a layer, a service data unit (SDU) is a packet received from an upper layer, and a protocol data unit (PDU) is a packet that includes a header of the layer and zero or more SDUs and is transmitted to a lower layer. The header may have subheaders corresponding to different elements/fields or the SDUs.

The MAC layer 330 is capable of generating and transmitting MAC control elements corresponding to a capability report, and detecting packet errors for a received MAC protocol data unit (PDU). In addition, the MAC layer 330 works with transmission time intervals (TTIs) each used as a transmission opportunity. The capability report can be a buffer status report (BSR) or a power headroom report (PHR). The MAC PDU includes packet elements of a MAC header, zero or more MAC service data units (SDUs), zero or more MAC control elements, and optionally padding. The MAC control element corresponding to the BSR is hereinafter called BSR control element, whereas the MAC control element corresponding to the PHR is hereinafter called PHR control element. Furthermore, the MAC control element corresponding to cell radio network temporary identifier (C-RNTI) is hereinafter called C-RNTI control element. BSR types include regular, periodic, padding, and truncated types, and a regular, periodic, or padding BSR can be a long or short BSR depended on the number of related transmission channels (i.e. logical channels). PHR types include regular, periodic and padding types. Furthermore, a scheduling request can be made by the MAC layer 330 to request the network for more uplink resources.

Figure 4:
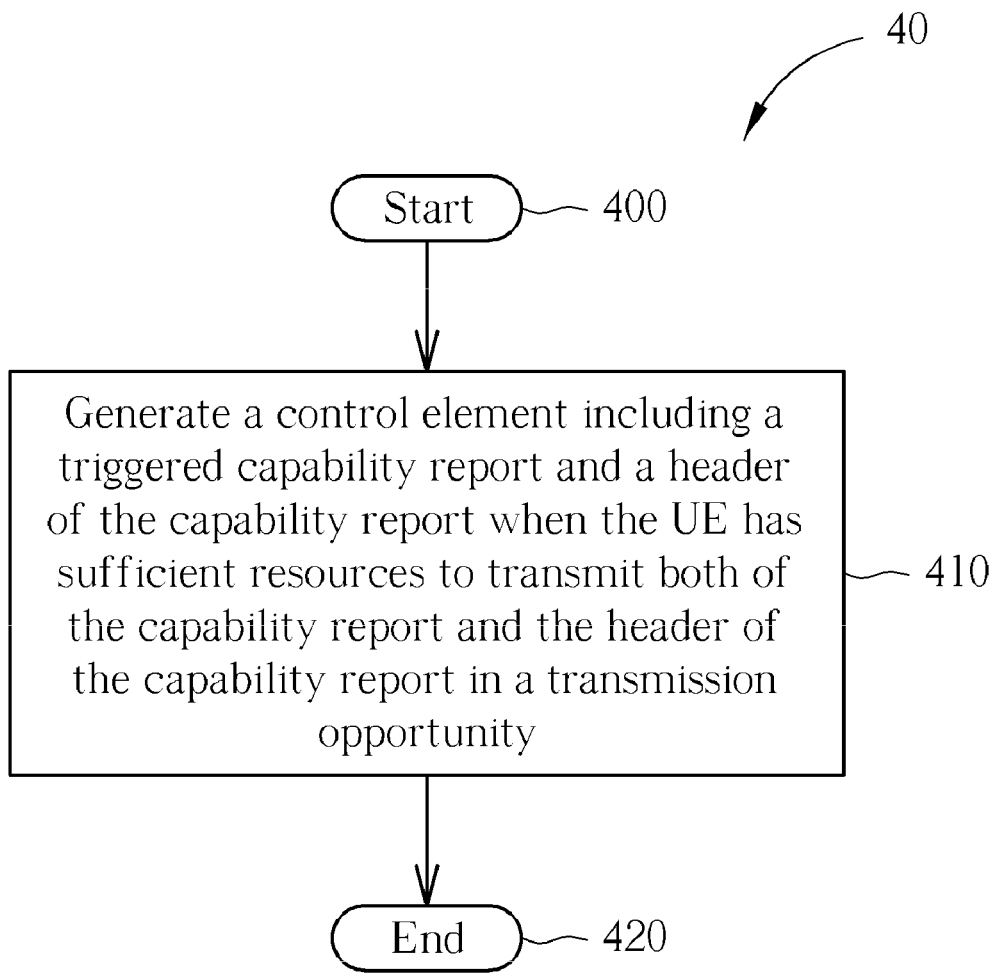
FIG. 4 is a flowchart of a process according to an embodiment of the present invention.

When a capability report is triggered and related resources are allocated in a transmission opportunity, an element generating process is provided herein to prevent a generated capability report from being delayed. Please refer to FIG. 4, which illustrates a flowchart of an element generating process 40 according to an embodiment of the present invention. The element generating process 40 is utilized for handling packet element transmission for a UE of a wireless communication system. The element generating process 40 can be compiled into the program code 214 and includes the following steps:

Step 400: Start.

Step 410: Generate a control element including a triggered capability report and a header of the capability report when the UE has sufficient resources to transmit both of the capability report and the header of the capability report in a transmission opportunity.

Step 420: End.

According to the element generating process 40, the control element is generated when the allocated resources of the UE is sufficient for transmission of both of the capability report and the header thereof in the transmission opportunity. In other words, the control element is not generated when the resources is insufficient for transmission of both of the capability report and the header thereof in the transmission opportunity. Through the process 40, the control element can be generated at a proper time, and the generated control element can be transmitted in this transmission opportunity.

Preferably, the element generating process 40 is used in a MAC layer of the UE. In this situation, the control element is a MAC control element placed in a header of a MAC PDU and in advance of MAC SDUs. The resources are uplink resources allocated for a transmission time interval (TTI) used as the transmission opportunity. The triggered capability report can be a BSR or a PHR, and thereby the MAC control element is accordingly generated as a BSR or a PHR control element. The BSR/PHR can be the first time to be triggered or can be triggered because of the last transmission of a BSR/PHR.

In this situation, the UE generates a BSR MAC control element when a BSR is triggered, uplink resources of the UE is allocated for a new transmission for a TTI and the UE has available bits (provided by the uplink resources) to include the triggered BSR and subheader thereof for transmission of the TTI. The triggered BSR can be a long BSR corresponding to a regular or periodic BSR. When the triggered BSR corresponds to the regular BSR, a scheduling request is triggered and the triggered BSR is configured to a pending state. A BSR with the pending state means that the BSR is pending for being transmitted or retransmitted in the next TTI instead of the current TTI.

On the contrary, a truncated BSR is generated when the UE has insufficient bits for a long BSR but sufficient bits for both of the truncated BSR and header thereof. The truncated BSR is preferably configured to the pending state. A scheduling request is triggered due to insufficient uplink resources, so as to request the network for more uplink resources for another truncated BSR.

In addition, all pending BSRs of the UE are cancelled after a long or short BSR control element is generated.

Furthermore, a PERIODIC BSR TIMER used for periodically triggering a BSR is started when Step 410 is performed. The PERIODIC BSR TIMER is restarted when the triggered BSR is not a truncated BSR. A RETX_BSR_TIMER used for retransmission corresponding to the triggered BSR is started when the RETX_BSR_TIMER does not run, or restarted when the RETX_BSR_TIMER has run.

Take an example herein. When a long BSR (32 bits) is triggered and a transport block size (e.g. 16 or 24 bits) is insufficient for transmission of the long BSR, the BSR control element is not generated. Instead, a truncated BSR can be generated if the space in the transport block is sufficient for a predetermined size of the truncated BSR and subheader thereof.

Take another example herein. At a serving cell change, a first UL-DCCH (Uplink Dedicated Control Channel) MAC SDU needing to be transmitted in a new cell has higher priority than a BSR control element. When the remaining space of the transport block which has included an C-RNTI and the first UL-DCCH MAC SDU is insufficient for a long BSR (32 bits) or a short BSR (16 bits), the BSR control element is not generated. Instead, a truncated BSR can be generated if the remaining space is sufficient for a predetermined size of the truncated BSR and subheader thereof.

Similarly, the UE generates the PHR MAC control element when a PHR is triggered, the UE has uplink resources allocated for a new transmission for a TTI, and the UE has available bits to include the PHR and subheader thereof for transmission of the TTI. A value of the PHR used in the MAC layer is obtained from a physical layer. The triggered PHR can be a regular or periodic PHR. All pending PHRs of the UE are cancelled after a PHR control element is generated.

Furthermore, a PERIODIC PHR TIMER used for periodically triggering a PHR is started when the PERIODIC PHR TIMER does not run, or restarted when the PERIODIC PHR TIMER has run. A PROHIBIT PHR TIMER for prohibiting trigger of a PHR is restarted.

Figure 5:
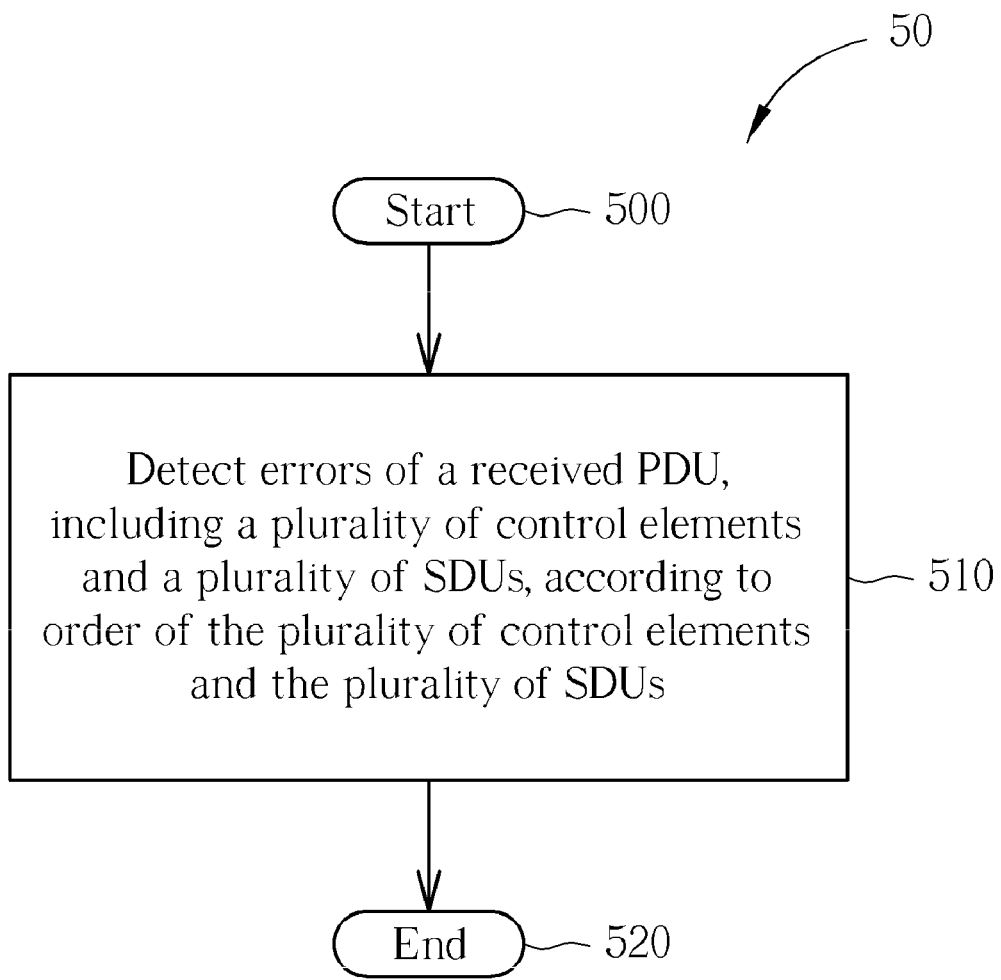
FIG. 5 is a flowchart of a process according to an embodiment of the present invention.

When a PDU is received by the UE, an error detecting process is provided herein to reduce a residual (undetected) error rate of the PDU. Please refer to FIG. 5, which illustrates a flowchart of an error detecting process 50 according to an embodiment of the present invention. The error detecting process 50 is utilized for handling packet element transmission for a UE of a wireless communication system. The error detecting process 50 can be compiled into the program code 214 and includes the following steps:

Step 500: Start.

Step 510: Detect errors of a received PDU, including a plurality of control elements and a plurality of SDUs, according to order of the plurality of control elements and the plurality of SDUs.

Step 520: End.

According to the error detecting process 50, the errors of the received PDU corresponding to misplacement of the plurality of control elements and SDUs are detected according to the order of the plurality of control elements and SDUs. Preferably, the order of the plurality of control elements and the plurality of SDUs is compared with a predetermined order that is a desire order of the control elements and the SDUs. The received PDU is determined as an erroneous PDU when the order of the plurality of received control elements and received SDUs does not conform to the predetermined order.

Preferably, the error detecting process 50 is applied to the MAC layer of the UE. In this situation, a negative acknowledgement (NACK) for the PDU is sent when the PDU is determined as an erroneous PDU. The predetermined order reveals that the control elements are placed in advance of the SDUs. When the control elements are used for uplink transmission, the predetermined order corresponding to control elements may be cell radio network temporary identifier (C-RNTI), BSR, and PHR. When the control elements are used for downlink transmission, the predetermined order corresponding to control elements may be contention resolution identity, control element for a timing advance of the UE, and discontinuous reception (DRX) command.

Further, the predetermined order includes an order from high to low priority for a plurality of logical channels corresponding to the plurality of SDUs. The priority information of the received SDUs can be obtained by reading a plurality of logical channel identifications (LCIDs) from the received PDU.

As can be seen from the above, when a PDU with misplaced control elements and SDUs is transmitted, the misplacement error, part of a packet error, can be detected at the receiving terminal (i.e. UE).

In conclusion, the embodiment of the present invention improves transmission of packet elements, such as the MAC control elements and the MAC SDUs, in element generating timing and in error detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of packet element transmission for a mobile device of a wireless communication system, the method comprising:
    generating a control element comprising a triggered capability report and a header of the capability report only when the mobile device has sufficient resources to transmit both of the capability report and the header of the capability report in a first transmission opportunity, wherein the capability report is a buffer status report, hereinafter called BSR; and
    cancelling all pending BSRs of the mobile device when the BSR is not a truncated BSR.

2. The method of claim 1, wherein the control element is a BSR control element of a medium access control layer.

3. The method of claim 2 further comprising:
    configuring the BSR to a pending state to transmit or retransmit the BSR in a second transmission opportunity following the first transmission opportunity when the BSR is the long BSR corresponding to the regular BSR.

4. The method of claim 2, further comprising when the BSR is the long BSR corresponding to the regular BSR or to the periodic BSR triggers, generating a truncated BSR when the mobile device has insufficient resources to transmit the long BSR but has sufficient resources to transmit both of the truncated BSR and a header of the truncated BSR.

5. The method of claim 4, further comprising configuring the truncated BSR to a pending state corresponding to transmission or retransmission of a second transmission opportunity following the first transmission opportunity.

6. The method of claim 2, further comprising at least one of the following:
    restarting a timer used for periodic trigger of the BSR when the BSR is not a truncated BSR;
    starting a timer used for periodic trigger of the BSR; and
    starting a timer for retransmission corresponding to the BSR when the timer does not run or restarting the timer when the timer has run.

7. The method of claim 1, further comprising triggering a scheduling request when the mobile device has insufficient resources to transmit both of the capability report and the header of the capability report in the first transmission opportunity.

8. The method of claim 7, wherein the capability report is triggered by a regular BSR.

9. A communication device of a wireless communication system of packet element transmission, the communication device comprising:
    a non-transitory computer readable recording medium for storing program code corresponding to a process;
    a processor coupled to the computer readable recording medium, for processing the program code to execute the process;
    wherein the process comprises:
    generating a control element comprising a triggered capability report and a header of the capability report only when the communication device has sufficient resources to transmit both of the capability report and the header of the capability report in a first transmission opportunity, wherein the capability report is a buffer status report, hereinafter called BSR; and
    cancelling all pending BSRs of the mobile device when the BSR is not a truncated BSR.

10. The communication device of claim 9, wherein the control element is a BSR control element of a medium access control layer.

11. The communication device of claim 10, wherein the process further comprises at least one of the following:
    restarting a timer used for periodic trigger of the BSR when the BSR is not a truncated BSR;
    starting a timer used for periodic trigger of the BSR; and
    starting a timer for retransmission corresponding to the BSR when the timer does not run or restarting the timer when the timer has run.

12. The communication device of claim 9, wherein the process further comprises triggering a scheduling request when the mobile device has insufficient resources to transmit both of the capability report and the header of the capability report in the first transmission opportunity.

13. The communication device of claim 12, wherein the capability report is triggered by a regular BSR.

* * * * *